(12) United States Patent
Larin (10) Patent No.: US 11,993,136 B2
(45) Date of Patent: May 28, 2024

(54) ROLLER BLIND DEVICE FOR A VEHICLE INTERIOR, AND ROLLER BLIND SHAFT FOR SAME

(71) Applicant: BOS GmbH & Co. KG, Ostfildern (DE)

(72) Inventor: Stanislav Larin, Esslingen am Neckar (DE)

(73) Assignee: BOS GMBH & CO. KG, Ostfildern (DE)

( * ) Notice: Subject to any disclaimer, the term of this patent is extended or adjusted under 35 U.S.C. 154(b) by 403 days.

(21) Appl. No.: 17/311,098

(22) PCT Filed: Nov. 7, 2019

(86) PCT No.: PCT/EP2019/080581
§ 371 (c)(1),
(2) Date: Jun. 4, 2021

(87) PCT Pub. No.: WO2020/114709
PCT Pub. Date: Jun. 11, 2020

(65) Prior Publication Data
US 2021/0331563 A1    Oct. 28, 2021

(30) Foreign Application Priority Data

Dec. 5, 2018  (DE) .......................... 102018221013.6

(51) Int. Cl.
*B60J 1/20* (2006.01)
*E06B 9/44* (2006.01)

(52) U.S. Cl.
CPC ............. *B60J 1/205* (2013.01); *B60J 1/2041* (2013.01); *E06B 9/44* (2013.01); *E06B 2009/445* (2013.01)

(58) Field of Classification Search
CPC ..... E06B 9/44; E06B 9/46; E06B 9/48; E06B 2009/445; B60J 1/205; B60J 1/2041
See application file for complete search history.

(56) References Cited

U.S. PATENT DOCUMENTS

| 2,300,024 A | 10/1942 | Terrell |
| 5,123,474 A * | 6/1992 | Smith ...................... E06B 9/50 160/310 |

(Continued)

FOREIGN PATENT DOCUMENTS

| CH | 678644 A5 | 10/1991 |
| CN | 101848820 A | 9/2010 |

(Continued)

OTHER PUBLICATIONS

Chinese Office Action issued in corresponding Chinese Application No. 201980080849.5, dated May 9, 2022 (7 pages).

(Continued)

*Primary Examiner* — Abe Massad
(74) *Attorney, Agent, or Firm* — FLYNN THIEL, P.C.

(57) ABSTRACT

A roller blind device for a vehicle interior including a roller blind shaft and a flexible textile sheet material, an end region of which is secured to the roller blind shaft in order to be wound and unwound relative to the roller blind shaft. The end region of the textile sheet material surrounds an outer casing of the roller blind shaft in the form of a loop which is annularly closed.

24 Claims, 5 Drawing Sheets

(56) References Cited

U.S. PATENT DOCUMENTS

| | | | | |
|---|---|---|---|---|
| 6,112,392 | A * | 9/2000 | Becker | E04F 10/0625 |
| | | | | 29/283 |
| 7,458,175 | B2 * | 12/2008 | Meyer | G09F 11/30 |
| | | | | 160/237 |
| 7,614,439 | B2 * | 11/2009 | Lukos | E06B 9/44 |
| | | | | 242/390.8 |
| 8,430,148 | B2 | 4/2013 | Thalhammer et al. | |
| 9,683,407 | B2 * | 6/2017 | Diamond | E06B 9/44 |
| 2013/0180666 | A1 * | 7/2013 | Mullet | E04F 10/0633 |
| | | | | 29/428 |
| 2015/0059988 | A1 | 3/2015 | Apdalhaliem et al. | |

FOREIGN PATENT DOCUMENTS

| | | |
|---|---|---|
| CN | 107848466 A | 3/2018 |
| DE | 19832360 C1 | 1/2000 |
| DE | 102014207408 A1 | 10/2015 |
| EP | 0974487 A2 | 1/2000 |
| JP | 10169339 A | 6/1998 |
| JP | H1181827 A | 3/1999 |
| JP | 200677507 A | 3/2006 |
| JP | 2014169595 A | 9/2014 |
| JP | 2014198972 A | 10/2014 |
| JP | 2016102000 A | 6/2016 |
| WO | 2016084540 A1 | 6/2016 |

OTHER PUBLICATIONS

German Office Action issued in corresponding German Application No. 10 2018 221 013.6 date of mailing Jul. 15, 2019 (6 pages).

International Search Report with English Translation issued in corresponding International Application No. PCT/EP2019/080581 date of mailing Feb. 18, 2020 (6 pages).

Written Opinion of International Searching Authority issued in corresponding International Application No. PCT/EP2019/080581 dated Feb. 18, 2020 (6 pages).

* cited by examiner

ROLLER BLIND DEVICE FOR A VEHICLE INTERIOR, AND ROLLER BLIND SHAFT FOR SAME

TECHNICAL FIELD

The invention relates to a roller blind device for a vehicle interior, having a roller blind shaft and a flexible textile sheet material. An end region of the sheet material is fixed to the roller blind shaft in order to be wound and unwound relative to the roller blind shaft. The invention additionally relates to a roller blind shaft for such a roller blind device.

BACKGROUND AND SUMMARY

A roller blind device of this type is known from DE 10 2014 207 408 A1. The known roller blind shaft has a recess extending along the roller blind shaft which, toward the inside, forms a hollow space which is arched in cross section. A flexible textile sheet material is held on the roller blind shaft, being provided with a T-shaped folded front edge. The textile sheet material is introduced into the recess and into the hollow space by means of this T-shaped folded front edge. The T-shaped folded front edge forms a form-fitting retention of the textile sheet material in the recess and in the hollow space, which results in the frontal attachment of the flexible textile sheet material to the roller blind shaft.

The configuration of the T-shaped front edge and the threading into the recess in the roller blind shaft are relatively complicated to carry out. In addition, the configuration of the roller blind shaft can lead to imbalances during rotation.

It is therefore desirable to devise a roller blind device and a roller blind shaft of the type mentioned at the beginning which avoid the disadvantages known from the prior art.

In the roller blind device of the invention, the end region of the textile sheet material encloses an outer casing of the roller blind shaft in the form of a loop, which is annularly closed. A diameter of the loop is preferably substantially larger than a diameter of the roller blind shaft, so that the end region of the textile sheet material can extend around the outer casing of the roller blind shaft with play. This arrangement achieves simplified mounting of the end region of the textile sheet material on the roller blind shaft. The roller blind device is provided for shading transparent areas in a vehicle interior such as roof areas, or for shading side, rear or front window areas. A corresponding shading device which is provided with a roller blind device can be provided in the roof area to shade transparent sections in the form of movable or stationary roof systems. The roller blind device can additionally be used for cargo compartment shading devices, in particular for the approximately horizontal covering of a cargo compartment or for the approximately vertical separation of a cargo compartment from a passenger compartment. The annular closure of the loop means that, transversely with respect to a pull-out direction from the roller blind shaft, the textile sheet material forms a channel-like hollow space over an entire width of the textile sheet material, in which hollow space the outer casing of the roller blind shaft is accommodated. The roller blind shaft preferably projects beyond the width of the textile sheet material on opposite side edges of the loop and therefore of the textile sheet material. The annular closure can be made by configuring the end region of the flexible textile sheet material in one piece, in that the end region of the textile sheet material is wound by at least one winding layer with a diameter that is substantially greater as compared with the diameter of the outer casing of the roller blind shaft and is fixed in the wound form. Alternatively, a fixing seam for securing the loop can be provided over the entire width of the textile sheet material, which can be produced in an integral manner by welding, adhesive bonding, mechanically by sewing or other mechanical securing means. The arrangement is suitable for cylindrical and also for at least partly conical roller blind shafts.

The rotationally symmetrical winding of the textile sheet material avoids imbalances during rotation of the roller blind shaft and therefore during a winding or unwinding operation in the subsequent operation of the roller blind device.

In one embodiment, the annular closure of the loop is produced by a fixing seam, extending transversely with respect to a winding device, of a front edge region of the textile sheet material on a surface section of the textile sheet material, and the outer casing of the roller blind shaft is assigned an adhesive strip, which is arranged opposite to the fixing seam in such a way that when the textile sheet material is loaded in tension, substantially radial compressive forces—relative to an axis of rotation of the roller blind shaft—act through the loop of the textile sheet material on the adhesive strip. In the sense of this embodiment, substantially radial compressive forces are present if at least 50% of the area of the adhesive strip is loaded radially inwardly in compression by the loop under tensile shaft loading of the textile sheet material, corresponding to a pulling-off movement from the roller blind shaft. This avoids creeping or wandering movements of the adhesive strip on the outer casing of the roller blind shaft occurring in the circumferential direction. This makes it possible that, when the textile sheet material is unwound completely from the roller blind shaft and is therefore pulled off, in which state the closed loop is stretched in the pulling direction, secure integral retention of the loop and therefore of the textile sheet material on the roller blind shaft is nevertheless ensured. The adhesive strip provided can be a double-sided adhesive strip, a strip-like adhesive bead or else a hook and loop strip arrangement.

In a further embodiment, the outer casing of the roller blind shaft has at least one, preferably two different, radial offset steps which each extend over part of a circumference of the outer casing, and in which an outer diameter of the outer casing is reduced as compared with a complete cylindrical shape of the outer casing. The at least one radial offset step is used to compensate for the thickness of the adhesive strip located on the outer casing of the roller blind shaft. This means that the at least one radial offset step is provided at the location at which the adhesive strip is to be applied to the roller blind shaft. If at least two different radial offset steps are provided, the formation of folds of the textile sheet material as the loop of the textile sheet material is wound onto the roller blind shaft can additionally be compensated for. The at least one further radial offset step is positioned at the location on the outer casing of the roller blind shaft at which, after the loop has been fixed to the adhesive strip, the fold which necessarily forms as the textile sheet material is wound up is located on the roller blind shaft. The radial offset steps are used to achieve uniform, rotationally symmetrical winding of the textile sheet material despite thickenings which are necessarily present on account of the adhesive strip, on account of the formation of folds or on account of the fixing seam.

In a further embodiment, a radial offset step is configured in such a way that it compensates for the dimensions of the adhesive strip in the circumferential direction and in the radial direction on the roller blind shaft relative to the complete cylindrical shape of the outer casing. The dimensions of the adhesive strip and the dimensions of the radial offset step—seen in the longitudinal direction, circumferential direction and radial direction of the roller blind shaft—are complementary to one another.

In a further embodiment, a further radial offset step is configured in such a way that it compensates for the dimensions of the loop in the circumferential direction and in the radial direction if a fold is formed by winding the textile sheet material onto the outer casing. In addition—relative to an axis of rotation of the roller blind shaft—this radial offset step is accordingly complementarily matched in the circumferential direction and in the radial direction to the dimensions of the fold of the loop when the textile sheet material is wound up. If a third radial offset step is provided for the fixing seam, complimentary matching of the dimensions of this radial offset step of the roller blind shaft and the dimensions of the fixing seam is also provided.

The roller blind shaft is preferably produced from a lightweight metal alloy by an extrusion process. Accordingly, appropriate radial offset steps are already taken into account during production and created over the entire length of an extrusion to be produced. Only the desired length of the roller blind shaft is subsequently achieved individually by correspondingly cutting the produced extrusion to length.

In a further embodiment, the at least two radial offset steps overlap one another or are at least partly arranged to be offset relative to one another in the circumferential direction. The configuration and arrangement of the radial offset steps on the outer casing of the roller blind shaft depend on how the adhesive strip, the formation of folds and, if appropriate, the fixing seam are aligned relative to the outer casing of the roller blind shaft when the textile sheet material is wound up, that is to say whether they overlap or adjoin in the circumferential direction or are offset from one another in the circumferential direction. If the fixing seam and/or the formation of folds and/or the adhesive strip at least partly overlap one another when the textile sheet material is wound up, a corresponding overlap of the radial offset step is also implemented in an analogous way. In practice, the arrangement, configuration and orientation of the radial offset steps relative to the roller blind shaft can be made in that, empirically or via computer calculations, corresponding layers of the loop, of the adhesive strip, of the fixing seam and the formation of folds are determined and the arrangement, dimensioning and orientation of the radial offset stages are performed on the basis of the determination.

Further, in at least one casing section offset in the circumferential direction relative to at least one radial offset step, the roller blind shaft is provided with material recesses, in order to achieve a uniform mass distribution of the roller blind shaft. As a result, rotation is possible during the operation of the roller blind shaft without mass imbalances occurring. This permits simplified rotational mounting of the roller blind shaft and increases the quality of a winding or unwinding operation of the textile sheet material. Appropriate rotary bearings for the roller blind shaft are stressed to a reduced extent by the imbalance compensation, so that the rotary bearings can be designed more simply and therefore more economically. This arrangement can advantageously be combined with the previously described arrangement of the loop formation and the fixing of the loop to the roller blind shaft by means of an adhesive strip, and also the associated embodiments.

In one embodiment, the material recesses are configured as hollow profiles extending over an entire length of the roller blind shaft. This permits the hollow profiles already to be established during the production of the roller blind shaft in a one-step operation, since the hollow profiles can already be shaped in an extrusion process for producing an extrusion consisting of a lightweight metal alloy.

In a further embodiment, the hollow profiles are radially outwardly open to the outer casing, forming longitudinal slots, of which the opening cross section is matched to an inherent stiffness of the textile sheet material when the latter is wound onto the roller blind shaft, in such a way that the textile sheet material does not fall into the longitudinal slot when wound onto the outer casing. This embodiment permits a reduction in the weight of the roller blind shaft without the cylindrical winding structure of the textile sheet material being impaired thereby.

For the roller blind shaft, same is provided with the features as have already been described with reference to the previously disclosed embodiments.

In one embodiment of the roller blind shaft, the roller blind shaft is designed as a hollow profile with an inner contour that is star shaped in cross section. The star-shaped inner contour can already be molded in during the production of the roller blind shaft from a lightweight metal alloy in an extrusion process. The star-shaped inner contour reduces weight and nevertheless an adequate wall stiffness of the roller blind shaft.

Further features and advantages of the invention emerge from the claims and from the following description of preferred exemplary embodiments of the invention, which are illustrated with reference to the drawings.

DETAILED DESCRIPTION

A roller blind device 1 according to FIGS. 1 to 4 is provided for a cargo compartment cover in a station wagon. The roller blind device 1 is integrated in a cassette housing 2 of the cargo compartment cover. The cassette housing 2 has a passage slot 3 in the region of a side wall, through which a flexible textile sheet material 4 of the roller blind device 1 can be pulled out and in. The flexible textile sheet material 4 which, in particular, is configured in the form of a textile web or a plastic film web, is held on a roller blind shaft 5 such that it can be wound up and unwound in a manner described in more detail below. At its opposite front ends, the roller blind shaft 5 is rotatably mounted in the cassette housing 2 in a manner not specifically illustrated. To this end, the cassette housing 2 has in its opposite front end regions corresponding bearing elements, which ensure the rotatable mounting of the roller blind shaft 5 about an axis of rotation D. The flexible textile sheet material 4, which forms a covering web or tarpaulin of the cargo compartment cover, lies flat on an outer casing of the roller blind shaft 5 or on an appropriate winding layer of the textile sheet material 4 over its entire width, which is oriented parallel to the axis of rotation D. The roller blind shaft 5 has a length which is greater than the width of the flexible textile sheet material 4. The flexible textile sheet material 4 is preferably configured as a rectangular blank. The roller blind shaft 5 is at least largely cylindrical. In an embodiment of the invention that is not illustrated, the roller blind shaft widens conically along the axis of rotation. In this embodiment, not illustrated, the blank of the flexible textile sheet material is accordingly not rectangular, but is instead matched to the conical configuration of the roller blind shaft in such a way that a front end region of the flexible textile sheet material (that is in front in the pull-out direction) remains parallel to the axis of rotation of the roller blind shaft during a pulling-out operation.

Figure 1:
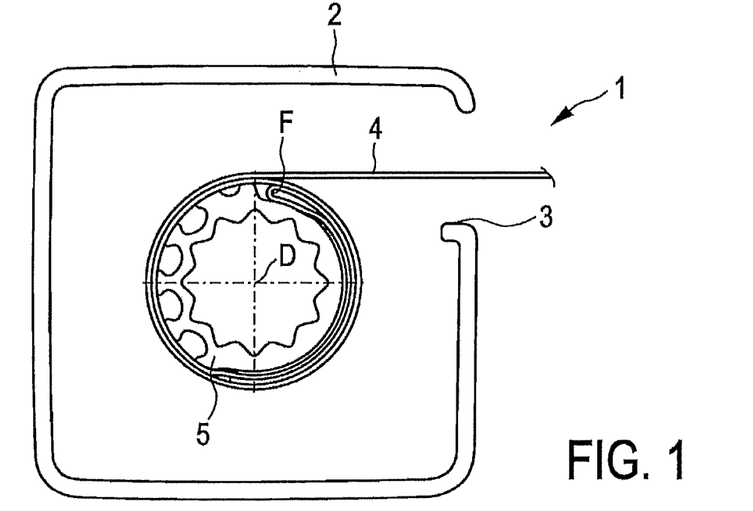
FIG. 1 shows, schematically in a cross-sectional illustration, an embodiment of a roller blind device according to the invention in a cassette housing of a cargo space protection device.
Figure 2:
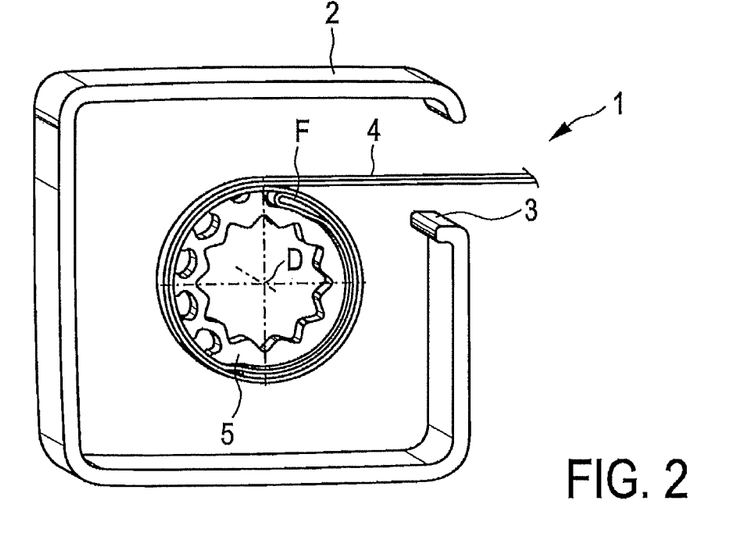
FIG. 2 shows the embodiment according to FIG. 1 in a three-dimensional sectional illustration.
Figure 3:
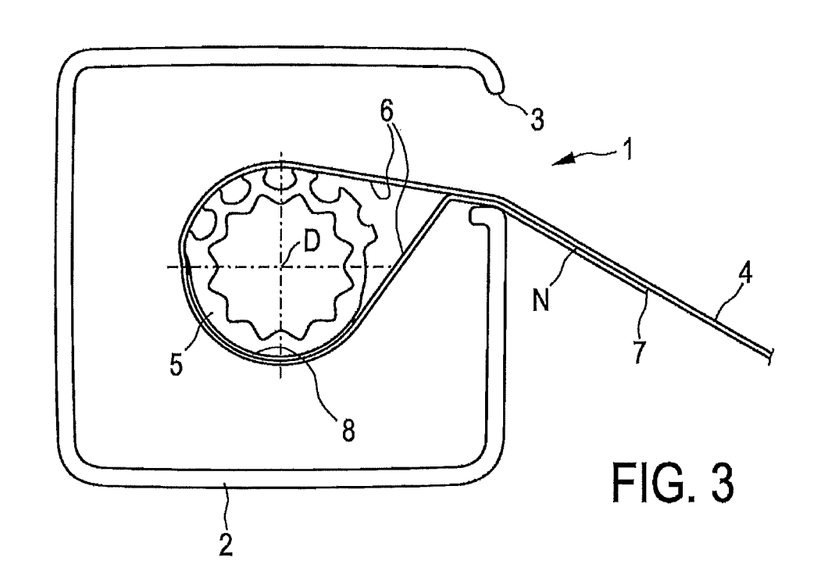
FIG. 3 shows the roller blind device according to FIG. 1 in the completely unwound state of a flexible textile sheet material held on the roller blind shaft.

An end region of the flexible textile sheet material 4 that is assigned to the roller blind shaft 5 is configured as an annularly closed loop 6, which encloses the roller blind shaft 5 according to FIG. 3. The end region of the textile sheet material 4 is laid around the roller blind shaft 5 with play. A front edge 7 of the textile sheet material 4 can be seen with reference to FIG. 3. As can likewise be gathered from FIG. 3, an end section of the textile sheet material 4 that adjoins the front edge 7 is doubled with a surface section of the end region of the textile sheet material 4 that is not specifically designated. In these regions lying on one another, the corresponding sections of the textile sheet material 4 are fixed to one another over an entire width of the textile sheet material 4 by means of a fixing seam N. The fixing seam N can be made by sewing the two surface sections, or else by welding or adhesive bonding—depending on the material configuration of corresponding surfaces, of the textile sheet material 4. The closed annular loop 6 thus formed has a greater diameter than a diameter of the roller blind shaft 5, with the result that, according to the illustration of FIG. 3, when the loop 6 wraps around the roller blind shaft 5 when the textile sheet material 4 is tensioned, play remains on one side between the loop 6 and the roller blind shaft 5.

To ensure that the loop 6 and the roller blind shaft 5 cannot rotate relative to each other—relative to the axis of rotation D—an adhesive strip 8 which, in the exemplary embodiment illustrated is designed as a double-sided adhesive strip, is provided between the loop 6 and the outer casing of the roller blind shaft 5. The adhesive strip 8 extends over the entire width of the textile sheet material 4 and therefore over virtually the entire length of the roller blind shaft 5. The adhesive strip 8 is additionally bonded flat to a sub-region of the outer casing of the roller blind shaft 5. The outer surface of the strip 8 is bonded to an inner surface section of the loop 6 of the flexible textile sheet material 4. The fixing seam N of the loop 6 is arranged approximately opposite to the arrangement of the adhesive strip 8 in relation to the roller blind shaft 5, with the result that when tensile loads are applied to the textile sheet material 4, substantially radial compressive forces are applied to the adhesive strip 8 from outside by the loop 6. This prevents the adhesive strip 8 creeping or wandering along the outer casing of the roller blind shaft 5 when tensile loads are applied permanently by the textile sheet material 4. Therefore, a permanently active adhesive fixing of the loop 6 to the outer casing of the roller blind shaft 5 can be achieved.

The fixing seam N extends over the entire width of the textile sheet material 4. With reference to FIG. 3, it can be seen that the fixing seam N also extends in the pull-out direction of the textile sheet material 4 over a certain length which, in FIG. 3, can be seen by the surface sections of the textile sheet material 4 lying flat on one another. Therefore, when sewing, a seam is formed over the entire surface strip. In the same way, the surface strip thus formed is achieved in an integral connection by appropriate flat welding or flat adhesive bonding.

Figure 4:
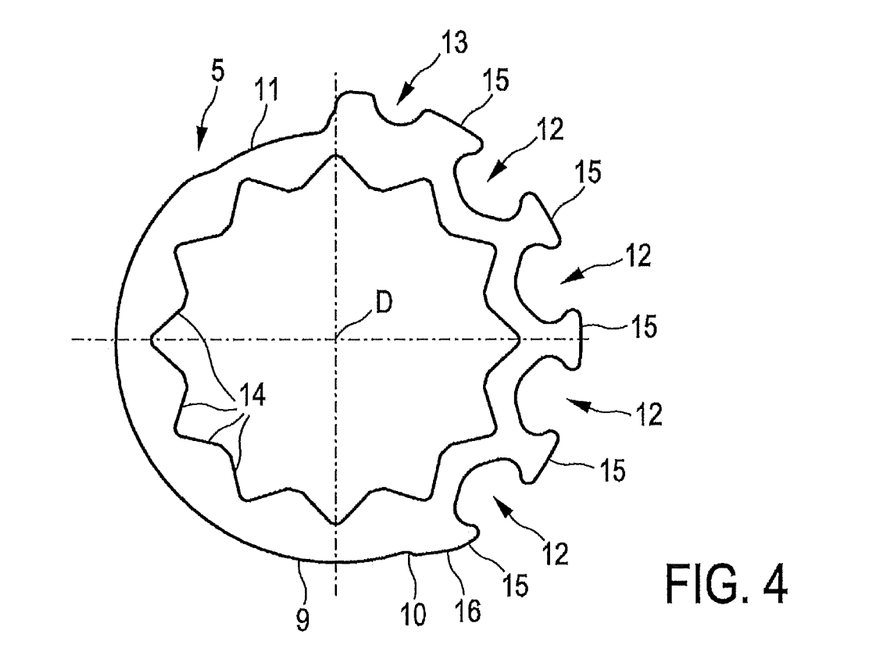
FIG. 4 shows the roller blind shaft of the roller blind device according to FIGS. 1 to 3 in an enlarged illustration.

With reference to FIG. 4, it is easy to see that the roller blind shaft 5—viewed in cross section—has a star-shaped inner contour 14. Therefore, the inner contour of the roller blind shaft 5 is provided with longitudinal grooves or longitudinal profiles distributed in a star shape over the inner circumference, which extend over an entire length of the roller blind shaft 5.

The outer casing of the roller blind shaft 5 is provided in the area of one half (in FIG. 4 the right-hand drawing half) with hollow profiles 12 extending longitudinally, i.e. parallel to the axis of rotation D, which form material recesses. The hollow profiles 12 are radially outwardly open. In the embodiment according to FIG. 4, four identically configured hollow profiles 12 are distributed at uniform intervals over the circumference of the outer casing of the roller blind shaft. These hollow profiles 12 are configured identically to one another.

In addition, a further, channel-shaped hollow profile 13 is also provided. All the hollow profiles 12, 13 extend over the entire length of the roller blind shaft 5.

The roller blind shaft 5 is produced from a lightweight metal alloy in an extrusion process, so that the star-shaped inner contour 14 and the hollow profiles 12, 13 are already formed during the production of a corresponding semi-finished product in the form of an extrusion. The roller blind shaft 5 is produced by appropriately cutting the extrusion to length. Outer casing sections 15 of the roller blind shaft 5 in the circumferential direction between the hollow profiles 12, 13 are configured in the form of a cylindrical section and define a cylindrical outer circumference of the outer casing of the roller blind shaft 5 and therefore, in cross section, an outer circular line coaxial with the axis of rotation D.

The outer casing of the roller blind shaft 5 is provided with radial steps 9 to 11 which are offset in the circumferential direction relative to the cylindrical outer casing sections 15 and which, in cross section, extend on different circular lines with a smaller radius relative to the axis of rotation D than the outer casing sections 15. Each radial offset step extends in the circumferential region over a subregion of the outer casing of the roller blind shaft 5 and in the longitudinal direction over an entire length of the roller blind shaft 5. One section 10 represents a transition step to the radial offset step 9 extending in the circumferential direction. The radial offset step 9 is provided to bond the adhesive strip 8 in the longitudinal direction and along the circumference. The radial offset step 11 is used to accommodate a fold F of the loop 6 of the flexible textile sheet material 4 which is formed when the textile sheet material 4 from the illustration according to FIG. 3 is wound up according to FIGS. 1 and 2. The corresponding radial offset steps 9, 11 reduce the cylindrical outer diameter of the roller blind shaft 5 by the thickness—viewed radially—of the adhesive strip 8 or of the fold F, in order to ensure that the flexible textile sheet material 4 is wound continuously cylindrically and uniformly onto the roller blind shaft 5 despite these sectional thickenings. The arrangement and widening of the textile sheet material 4 relative to the roller blind shaft 5 is illustrated once more in somewhat more detail with reference to the embodiment according to FIGS. 5 to 8. FIGS. 5 to 8 show a roller blind device 1a which is at least largely configured identically to the roller blind device 1 according to FIGS. 1 to 4. To avoid repetitions, for the roller blind device 1a according to FIGS. 5 to 8, reference is made to the explanations relating to the roller blind device 1 according to FIGS. 1 to 4. The single difference in the roller blind device 1a according to FIGS. 5 to 8 is that the hollow profiles in the region of the outer casing of the roller blind 5a (not illustrated in FIG. 5, although indicated in FIG. 8), are designed differently from the hollow profiles 12 and 13 according to FIGS. 1 to 4. In both embodiments according to FIGS. 1 to 8, the hollow profiles are used to achieve a uniform mass distribution over the circumference of the roller blind shaft. Since wall sections of the roller blind shaft 5 or 5a in the region of the radial offset steps 9 to 11 are solid but represent a reduced outer circumference, the oppositely arranged hollow profiles in the region of the greater outer circumference compensate for the corresponding mass differences of the wall of the roller blind shaft 5. The radially outwardly open hollow profiles 12 and 13 are designed in such a way that the flexible textile sheet 4a wound onto the outer casing of the roller blind shaft 5, 5a does not fall into these material recesses. This can easily be seen with reference to FIGS. 1 and 8.

Both embodiments of the roller blind shaft 1 and the roller blind shaft 1a are provided with the same designations for identical or functionally identical parts or sections but with the addition of the letter a with respect to the roller blind device 1a. The explanations relating to the roller blind device 1 according to FIGS. 1 to 4 apply in the same way to the roller blind device 1a according to FIGS. 5 to 8. In addition, the description of the winding operation of the textile sheet material 4a according to FIGS. 5 to 8 applies in the same way to a winding operation of the textile sheet material 4 in the roller blind device 1 according to FIGS. 1 to 4.

Figure 5:
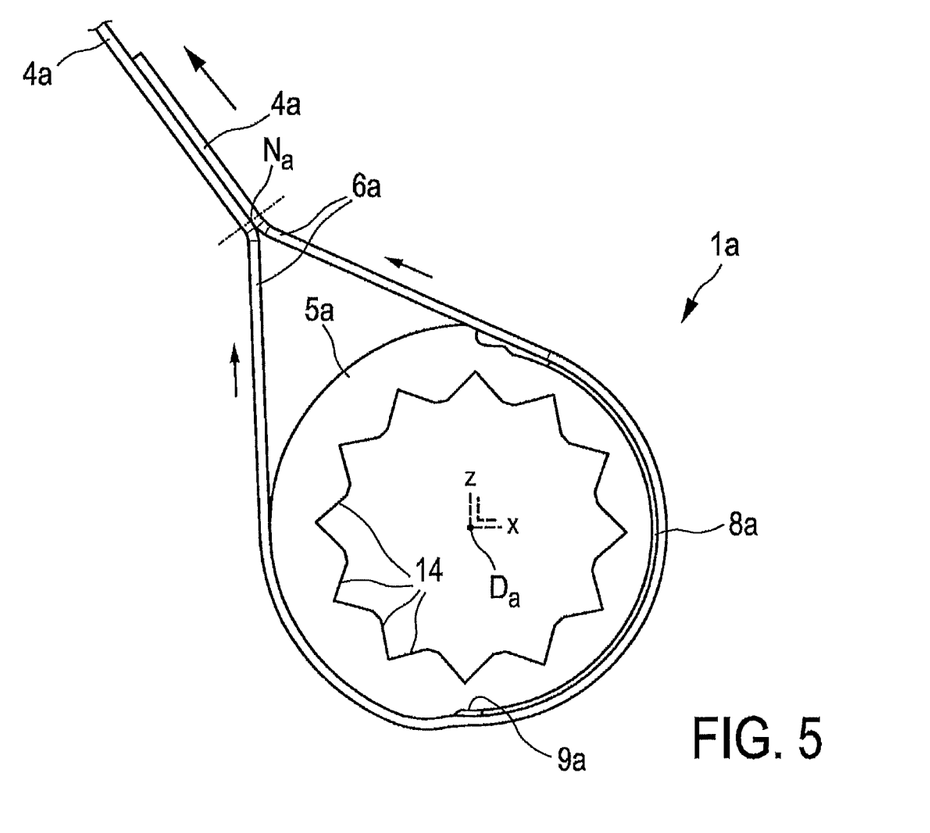
FIGS. 5 to 8 show a further embodiment of a roller blind device according to the invention similar to FIGS. 1 to 4 in different winding stages of the flexible textile sheet material.
Figure 6:
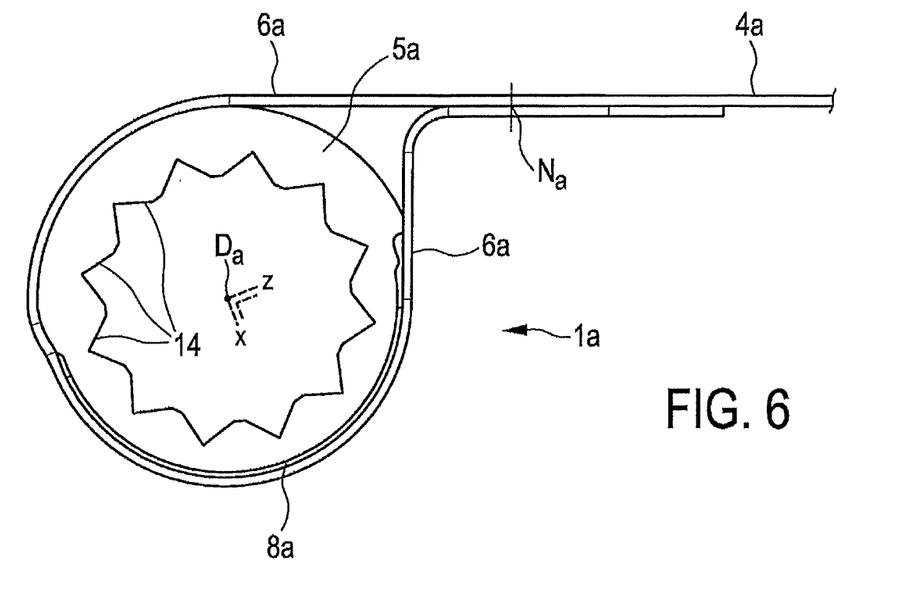
Figure 7:
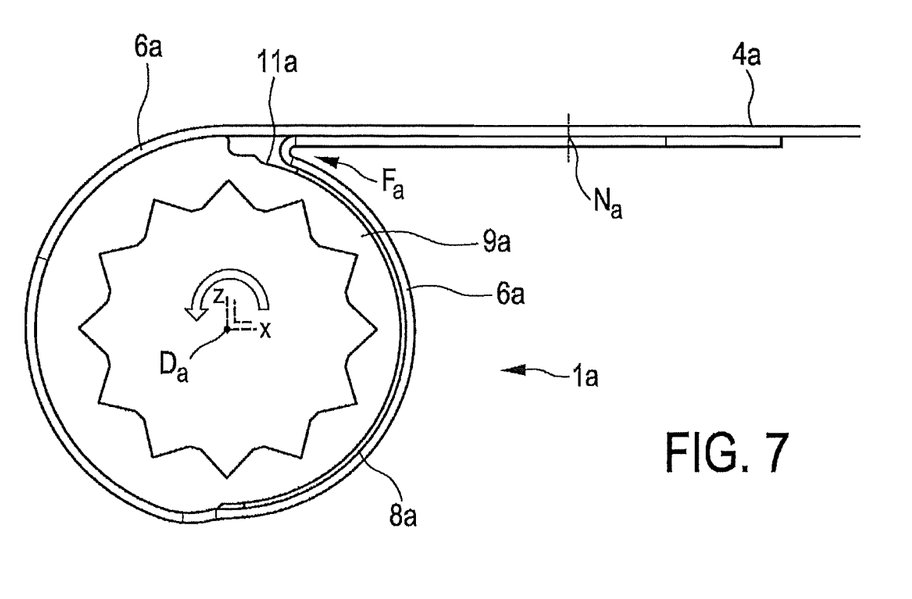
Figure 8:
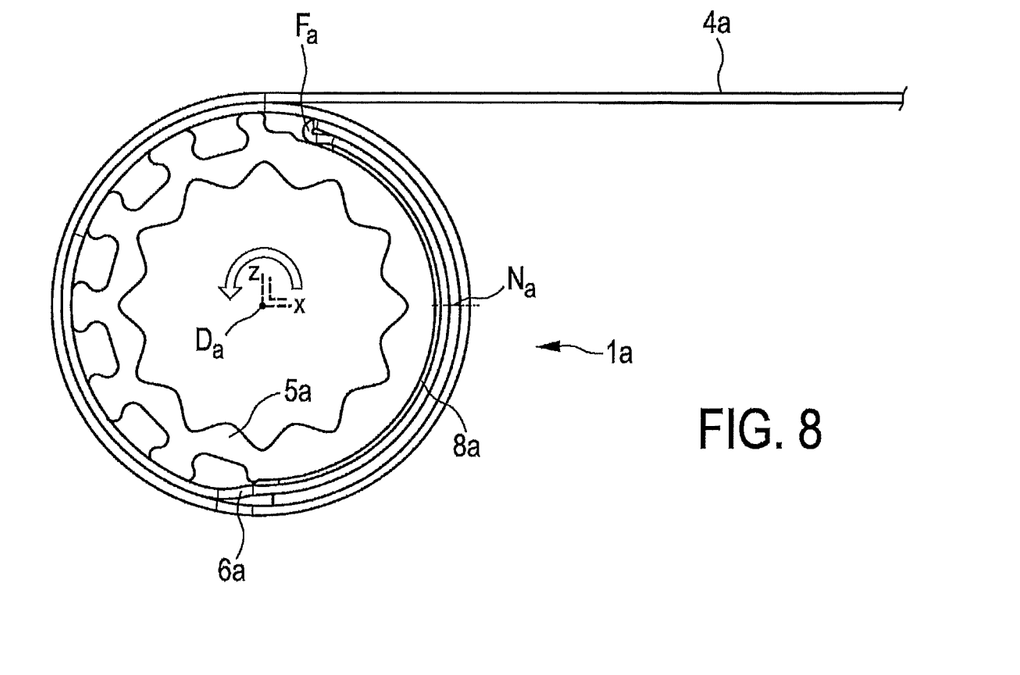

It can be seen from FIG. 5 that the adhesive strip 8a is at least largely opposite the fixing seam $N_a$, as long as the textile sheet material 4a is loaded in tension in the direction of the thick arrow in FIG. 5. On the opposite run of the loop, corresponding tensile forces act on the loop 6a, which are indicated by the small arrows in FIG. 5. Given such a tensile loading, virtually exclusively radial compressive forces act on the adhesive strip 8a through the loop 6a, at least over half of the circumferential strip 8a—seen in the circumferential direction of the roller blind shaft 5a. Then, according to FIG. 6, as soon as the loop 6a is folded adjacent to the fixing seam $N_a$, the result is necessarily the fold $F_a$, according to FIG. 7. The latter is embedded in the region of a radial offset step 11a. This step 11a is adjoined in the circumferential direction by a further radial offset step 9a, on which the adhesive strip 8a is secured. During a further rotation of the roller blind shaft 5a in the counterclockwise direction about the axis of rotation $D_a$ (FIGS. 7 and 8), the textile sheet material 4a is wound uniformly cylindrically onto the roller blind shaft 5a, the fold $F_a$ in conjunction with the fixing seam $N_a$ and the adhesive strip 8a being positioned in the area of the radial offset steps 9a and 11a, which extend approximately over half the circumference of the outer casing of the roller blind shaft 5a (FIG. 8). Since, on the opposite half of the roller blind shaft 5a, the roller blind shaft has thicker walls, material recesses in the form of hollow profiles must also be provided here (FIG. 8), as in the embodiment according to FIGS. 1 to 4, which once more compensate for any mass imbalance that arises.

Figure 9:
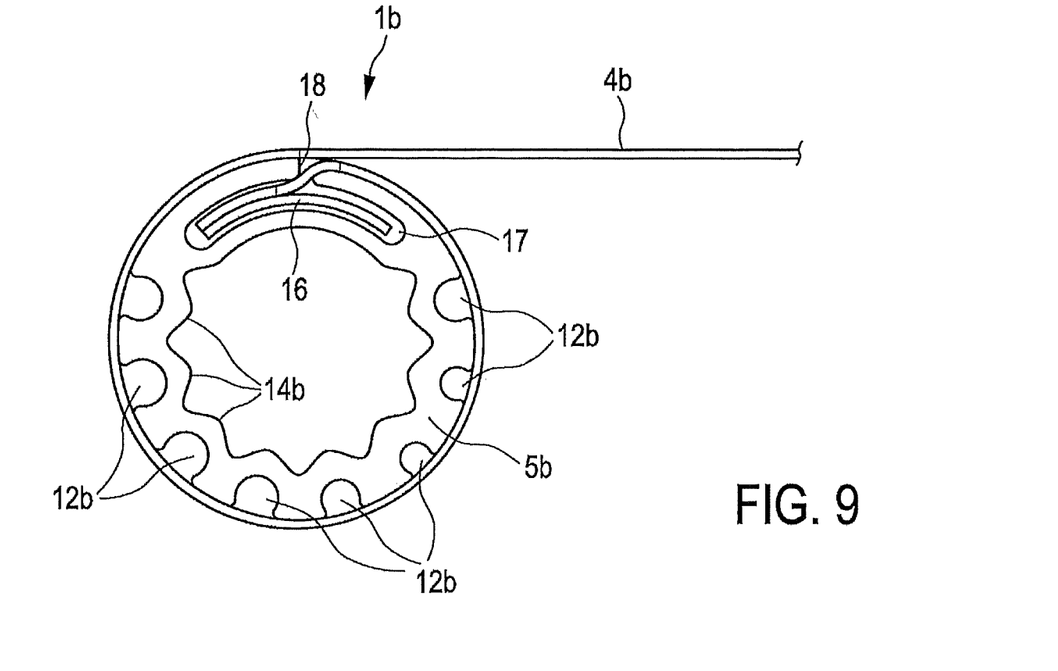
FIG. 9 shows, schematically, a further embodiment of a roller blind device according to the invention.

In the roller blind device 1b according to FIG. 9, a fixing of the flexible textile sheet material 4b to the roller blind shaft 5b that is different from the roller blind device 1 or 1a according to FIGS. 1 to 8 is provided. The fixing corresponds largely to the securing of the flexible textile sheet material to the roller blind shaft as illustrated in DE 10 2014 207 408 A1. A front end region of the flexible textile sheet material 4b in the roller blind device 1b is firmly connected to a web section 16 which is curved in the form of a circular arc in cross-sectional profile and which is integrated into a hollow space 17 of the roller blind shaft 5b which is likewise curved in the form of a circular arc in cross section. The web-like holding strip 16 is preferably pushed axially into the hollow space 17. The hollow space 17, and also the roller blind shaft 5b overall, is open toward both front end faces. The roller blind shaft 5b is produced in a way analogous to the previously described embodiments as a hollow extruded profile made of a lightweight metal alloy. The hollow space 17 is radially outwardly open via a longitudinal slot, which is positioned approximately centrally relative to the hollow space 17. An outer casing of the roller blind shaft 5b in the region of this radial longitudinal slot forms a radial offset step 18, as can be gathered from FIG. 9. In order to be able to compensate for wall thickenings in the region of the hollow space 17 of the wall of the roller blind shaft 5b, the wall of the roller blind shaft 5b configured as a hollow profile offset in the circumferential direction relative to the hollow space 17 and the radial longitudinal slot is provided with radially outwardly open hollow profiles 12b. An inner contour of the roller blind shaft 5b is profiled in a star shape in cross section coaxially to an axis of rotation, not shown, of the roller blind shaft 5b, forming the star-shaped inner contour 14b. As distinct from the roller blind shaft 5 and 5a according to FIGS. 1 to 8, the star shape of the inner contour is not distributed uniformly over the entire inner circumference of the roller blind shaft 5b. Instead, the inner contour 14b extends only over the region of the inner circumference of the roller blind shaft 5b which is offset in the circumferential direction relative to the hollow space 17 of the roller blind shaft 5b. In the region of the circular arc-shaped hollow space 17b, the inner contour of the roller blind shaft 5b is configured in the manner of a cylindrical section.

The radial offset step 18 is matched to a thickness of a winding layer of the textile sheet material 4b, in order to be able to achieve uniform cylindrical winding of the textile sheet material 4b on the roller blind shaft 5b.

The invention claimed is:

1. A roller blind device for a vehicle interior, said roller blind device comprising:
   a roller blind shaft defining a rotational axis and having an outer casing, said outer casing including:
      an outer surface section extending partially about the rotational axis and having a cylindrical outer contour lying along part of an imaginary circle coaxial with the rotational axis; and
      a stepped outer surface section, said stepped outer surface section being radially inwardly offset relative to said cylindrical outer contour of said outer surface section;
   said roller blind device further comprising a flexible sheet having a longitudinal dimension and a pair of end regions spaced longitudinally from one another, one of said end regions comprising an annularly closed loop circumferentially enclosing said outer casing of said roller blind shaft, said loop being non-rotatably fixed to said roller blind shaft, said flexible sheet being windable around said roller blind shaft into a wound configuration, said wound configuration comprising a plurality of winding portions of said flexible sheet disposed in superimposed relation with one another, one of said winding portions having first and second areas disposed circumferentially adjacent one another along said one winding portion, said first and second areas each having a radial thickness, said radial thickness of said first area being greater than said radial thickness of said second area, said first area being disposed in said stepped outer surface section of said roller blind shaft to provide said flexible sheet, in said wound configuration, with a uniform cylindrical outer contour when viewed along the rotational axis of said roller blind shaft.

2. The roller blind device according to claim 1, wherein said flexible sheet has a width dimension oriented transversely to the longitudinal dimension of said flexible sheet and a pair of edge regions spaced transversely from one another and oriented transversely to said end regions, and said stepped outer surface section extends continuously axially along said roller blind shaft along an entirety of the width dimension of said flexible sheet.

3. The roller blind device according to claim 1, wherein an adhesive is disposed between an inner surface of said loop and part of said stepped outer surface section to bond said loop to said outer casing and non-rotatably fix said loop thereto, said adhesive and a part of said loop bonded thereto together forming at least part of said first area.

4. The roller blind device according to claim 3, wherein said flexible sheet comprises a seam disposed to annularly close said loop, said seam being disposed substantially diametrically opposite to said adhesive such that when said flexible sheet is tensioned, substantially radially oriented forces act on said adhesive through said loop.

5. The roller blind device according to claim 1, wherein said flexible sheet comprises a seam disposed to annularly close said loop, said seam forming part of said first area.

6. The roller blind device according to claim 1, wherein said loop in said wound configuration of said flexible sheet comprises a folded portion, said folded portion forming part of said first area.

7. The roller blind device according to claim 1, wherein said loop in said wound configuration of said flexible sheet comprises a folded portion, said stepped outer surface section comprises first and second stepped sections, said first and second stepped sections being radially inwardly offset relative to said cylindrical outer contour of said outer surface section by respective radial distances which are different from one another, said loop comprising adhesive disposed between an inner surface of said loop and said first stepped section to bond said loop to said outer casing and non-rotatably fix said loop thereto, said folded portion of said loop being accommodated in said second stepped section in said wound configuration of said flexible sheet, wherein one or more of: said folded portion; and said adhesive and part of said loop bonded thereto; form said first area.

8. The roller blind device according to claim 7, wherein said first and second stepped sections extend circumferentially along part of said outer casing and are circumferentially adjacent one another or said first and second stepped sections are circumferentially offset relative to one another.

9. The roller blind device according to claim 1, wherein said outer casing comprises a plurality of recesses circumferentially offset from said stepped outer surface section to provide said roller blind shaft with a uniform mass distribution.

10. A roller blind device for a vehicle interior, said roller blind device comprising:
a roller blind shaft defining a rotational axis and having an outer casing, said outer casing comprising:
an outer surface section extending partially about the rotational axis and having a cylindrical outer contour lying along part of an imaginary circle coaxial with the rotational axis; and
a stepped outer surface section, said stepped outer surface section being radially inwardly offset relative to said cylindrical outer contour of said outer surface section;
said roller blind device further comprising a flexible sheet having a longitudinal dimension and a pair of end regions spaced longitudinally from one another, one of said end regions comprising an annularly closed loop circumferentially enclosing said outer casing of said roller blind shaft, said loop being non-rotatably fixed to said roller blind shaft, said flexible sheet being unwindable from said roller blind shaft in an extension direction into an extended position and windable onto said roller blind shaft into a retracted position, said flexible sheet in the retracted position comprising a wound configuration, said loop in said wound configuration of said flexible sheet comprising a folded portion accommodated in said stepped outer surface section of said roller blind shaft.

11. The roller blind device according to claim 10, wherein said flexible sheet has a width dimension oriented transversely to the longitudinal dimension of said flexible sheet and a pair of edge regions spaced transversely from one another and oriented transversely to said end regions, and said stepped outer surface section extends continuously axially along said roller blind shaft along an entirety of the width dimension of said flexible sheet.

12. The roller blind device according to claim 10, wherein an adhesive is disposed between an inner surface of said loop and part of said stepped outer surface section to bond said loop to said outer casing and non-rotatably fix said loop thereto, said flexible sheet comprises a seam disposed to annularly close said loop, said seam being disposed substantially diametrically opposite to said adhesive such that when said flexible sheet is tensioned, substantially radially oriented forces act on said adhesive through said loop.

13. The roller blind device according to claim 10, wherein said stepped outer surface section comprises first and second stepped sections, said first and second stepped sections being radially inwardly offset relative to said cylindrical outer contour of said at least one outer surface section by respective radial distances which are different from one another, said loop including an adhesive disposed between an inner surface of said loop and said first stepped section to bond said loop to said outer casing and non-rotatably fix said loop thereto, said folded portion of said loop being accommodated in said second stepped section in the wound configuration of said flexible sheet.

14. The roller blind device according to claim 13, wherein said first and second stepped sections extend circumferentially along part of said outer casing and are circumferentially adjacent one another or said first and second stepped sections are circumferentially offset relative to one another.

15. The roller blind device according to claim 10, wherein said outer casing comprises a plurality of recesses circumferentially offset from said stepped outer surface section to provide said roller blind shaft with a uniform mass distribution.

16. A roller blind device for a vehicle interior, said roller blind device comprising:
a roller blind shaft defining a rotational axis and having an outer casing comprising:
at least one recess;
a circumferentially extending outer surface portion, said outer surface portion including:
an outer surface section having a cylindrical outermost contour lying along part of an imaginary circle coaxial with the roller blind shaft; and
a stepped outer surface section, said stepped outer surface section being radially inwardly offset relative to said cylindrical outermost contour of said outer surface section, said at least one recess being circumferentially offset from said stepped outer surface section to provide said roller blind shaft with a uniform mass distribution;
said roller blind device further comprising a flexible sheet having a longitudinal dimension and a pair of end regions spaced longitudinally from one another, one of said end regions comprising an annularly closed loop circumferentially enclosing said outer casing of said roller blind shaft, said loop being non-rotatably fixed to said outer casing and retaining said flexible sheet on said roller blind shaft such that said flexible sheet is windable around said roller blind shaft into a wound configuration, said wound configuration of said flexible sheet comprising a plurality of winding portions of said flexible sheet disposed in superimposed relation with one another, one of said winding portions having first and second areas disposed circumferentially adjacent one another along said one winding portion, said first and second areas each having a radial thickness, said radial thickness of said first area being greater than said radial thickness of said second area, and said stepped outer surface section accommodating therein said first area of said one winding portion to provide said flexible sheet, in said wound configuration, with a uniform cylindrical outer contour when viewed along the rotational axis of said roller blind shaft.

17. The roller blind device according to claim 16, wherein said flexible sheet has a width dimension oriented transversely to the longitudinal dimension of said flexible sheet and a pair of edge regions spaced transversely from one another and oriented transversely to said end regions, and said stepped outer surface section extends continuously axially along said roller blind shaft along an entirety of the width dimension of said flexible sheet.

18. The roller blind device according to claim 16, wherein an adhesive is disposed between an inner surface of said loop and part of said stepped outer surface section to bond said loop to said outer casing and non-rotatably fix said loop thereto, said flexible sheet comprises a seam disposed to annularly close said loop, said seam being disposed substantially diametrically opposite to said adhesive such that when said flexible sheet is tensioned, substantially radially oriented forces act on said adhesive through said loop, and wherein one or more of: said adhesive and part of said loop bonded thereto; and said seam form said first area.

19. The roller blind device according to claim 16, wherein said flexible sheet comprises a seam disposed to annularly close said loop, said seam forming part of said first area of said one winding portion.

20. The roller blind device according to claim 16, wherein said loop in the wound configuration of said flexible sheet comprises a folded portion, said folded portion forming part of said first area of said one winding portion.

21. The roller blind device according to claim 20, wherein said stepped outer surface section comprises first and second circumferentially adjacent stepped sections, said first and second stepped sections being radially inwardly offset relative to said cylindrical outer contour of said at least one outer surface section by respective radial distances which are different from one another, said loop includes an adhesive disposed between an inner surface of said loop and said first stepped section to bond said loop to said outer casing and non-rotatably fix said loop thereto, said folded portion of said loop being accommodated in said second stepped section in the wound configuration of said flexible sheet.

22. The roller blind device according to claim 16, wherein said at least one recess comprises a plurality of recesses, said recesses extending along an entire length of said roller blind shaft.

23. The roller blind device according to claim 22, wherein each of said recesses opens radially outwardly through said outer surface section of said roller blind shaft, and a cross-section of each said recess at said outer surface section is dimensioned to correspond to a stiffness of said flexible sheet such that said flexible sheet does not enter said recesses when wound around said outer casing.

24. The roller blind device according to claim 16, wherein said flexible sheet has a width dimension oriented transversely to the longitudinal dimension of said flexible sheet and a pair of edge regions spaced transversely from one another and oriented transversely to said end regions, said loop defining a channel therein extending continuously along an entirety of the width dimension of said flexible sheet.

* * * * *